United States Patent [19]
Cowan

[11] Patent Number: 6,098,182
[45] Date of Patent: Aug. 1, 2000

[54] APPARATUS FOR MONITORING TESTS RUN ON A PERSONAL COMPUTER

[75] Inventor: Jeffrey Cowan, Meridian, Id.

[73] Assignee: Micron Electronics, Inc., Nampa, Id.

[21] Appl. No.: 08/994,372

[22] Filed: Dec. 19, 1997

[51] Int. Cl.[7] ................................................. H02H 3/05
[52] U.S. Cl. ............................... 714/25; 714/30; 714/34; 714/37; 714/39; 714/43; 714/44; 714/45; 714/57; 714/25
[58] Field of Search ................................. 714/100, 1–57, 714/763

[56] References Cited

U.S. PATENT DOCUMENTS

| | | | |
|---|---|---|---|
| 4,949,252 | 8/1990 | Hauge | 714/46 |
| 4,977,390 | 12/1990 | Saylor et al. | 340/521 |
| 5,029,168 | 7/1991 | Chan | 714/27 |
| 5,086,499 | 2/1992 | Mutone | 714/3 |
| 5,123,017 | 6/1992 | Simpkins et al. | 714/26 |
| 5,432,705 | 7/1995 | Severt et al. | 702/120 |
| 5,602,750 | 2/1997 | Severt et al. | 702/122 |
| 5,630,048 | 5/1997 | Joie et al. | 714/25 |
| 5,630,049 | 5/1997 | Cardoza et al. | 714/25 |
| 5,864,563 | 1/1999 | Ratcliffe | 714/12 |

Primary Examiner—Meng-Ai T. An
Assistant Examiner—Stacy A. Whitmore
Attorney, Agent, or Firm—Trop, Pruner & Hu, P.C.

[57] ABSTRACT

A personal computer monitoring device includes a reporting device and a processing unit. The reporting device is adapted to take a fail action responsive to a first signal. The processing unit is adapted to receive the first signal from an under test personal computer and to send the first signal to the reporting device when the processing unit does not receive a new result signal from the under test computer system during a preselected time period. One illustrative use of the monitoring device is during the assembly and pre-sale testing of personal computers.

19 Claims, 10 Drawing Sheets

APPARATUS FOR MONITORING TESTS RUN ON A PERSONAL COMPUTER

BACKGROUND OF THE INVENTION

1. Field of the Invention

This invention relates generally to monitoring and testing computers and more particularly, to methods and apparatus for externally monitoring tests that are running internally on a personal computer.

2. Description of the Related Art

Figure 1:
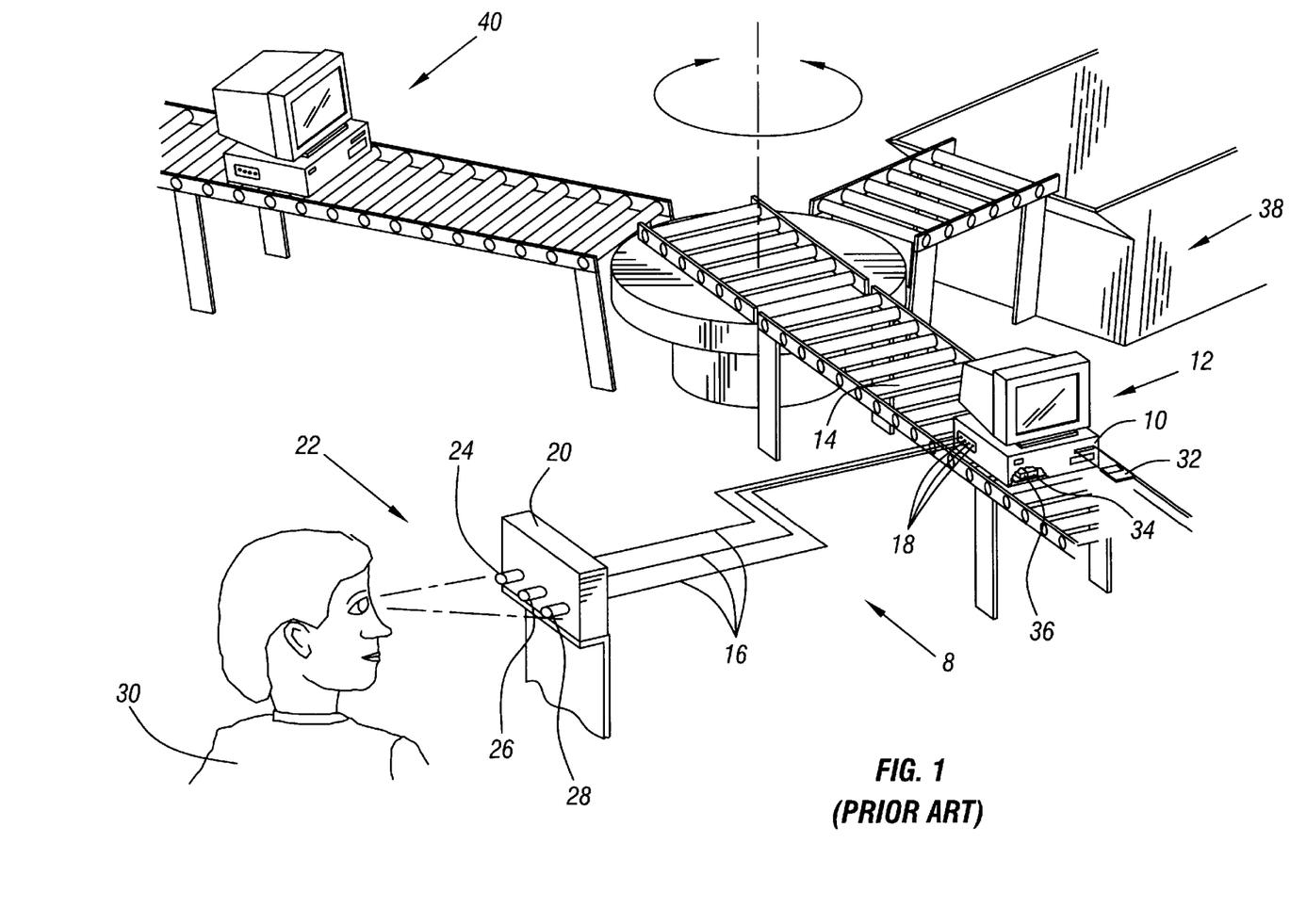
FIG. 1 is a prior art system for passively monitoring a personal computer undergoing internal testing at a remote test site.

FIG. 1 illustrates a prior art, passive monitoring system 8 for monitoring an internal test on a personal computer (PC) 10. The PC 10 is located at a remote test site 12 which may be, for example, a site on an assembly line or conveyor system 14. The first ends of three conducting wires 16 connect to individual parallel port pins 18 of the PC 10. A second end of each of the conducting wires 16 connects to a connector 20 located at an external monitoring station 22. The connector 20 holds red 24, yellow 26, and green 28 light emitting diodes (LED's). Logic +1 signals from the parallel port pins 18 have a voltage sufficient to activate the LED's 24, 26, and 28. The LED's 24, 26, and 28 are within viewing distance of and monitoring by a remote operator 30. The remote operator 30 may be a human or an automated device (not shown).

While the test is being run, a terminate and stay resident ("TSR") program encoded on a portable program storage medium 32 is loaded in a memory 34 of the remote PC 10. The TSR program periodically activates and reads status data from the memory 34. One or more status addresses 36, in the memory 34, contain the status data on an internal test. The TSR program periodically writes logic signals to the parallel port pins 18 to indicate the test's progress.

The logic signals written to the pins 18 by the internal TSR program power the LED's 24, 26, and 28. In one arrangement, the red LED 24 is lighted when the test has been failed, the yellow LED 26 is lighted while the test is proceeding, and the green LED 28 is lighted when the test has been passed successfully. By observing the LED's 24, 26, and 28, the operator 30 of the assembly line or conveyor system 14 can follow the progress of the test on the remote PC 10 and take appropriate actions. These actions may include sending the PC 10 to a repair or scrap area 38 when the red LED 24 is lighted, sending the PC 10 to the next station 40 on the assembly line or conveyor system 14 when the green LED 28 is lighted, and waiting while the yellow LED 26 is lighted.

The passive monitoring system 8 may fail due to malfunctions of the remote PC 10. In the remote PC 10, a "hard lock" malfunction can block a bus (not shown) thereby either blocking writes to the status addresses 36 or blocking signals at the parallel port pins 18 in a fixed configuration. If hard lock occurs, the signals from the LED's 24, 26, and 28 may not correspond to the actual test status of the remote PC 10. For example, suppose that the logic signals at the parallel port pins 18 were lighting the yellow LED 26 when a hard lock first occurred. In a hard lock, an internal bus serving the parallel port pins 18 may be blocked thereby making the output a continuous and non-alternating signal. Thus, in hard lock, the yellow LED 26 may continue being lighted and mislead the remote operator 30 into believing that the test is still proceeding normally. Since the remote operator 30 is not aware of the malfunction, he will wait instead of sending the PC 10 to the repair or scrap area 38. This wait will slow or stop the processing of other PC's (not shown) by the assembly line or conveyor system 14.

Figure 2:
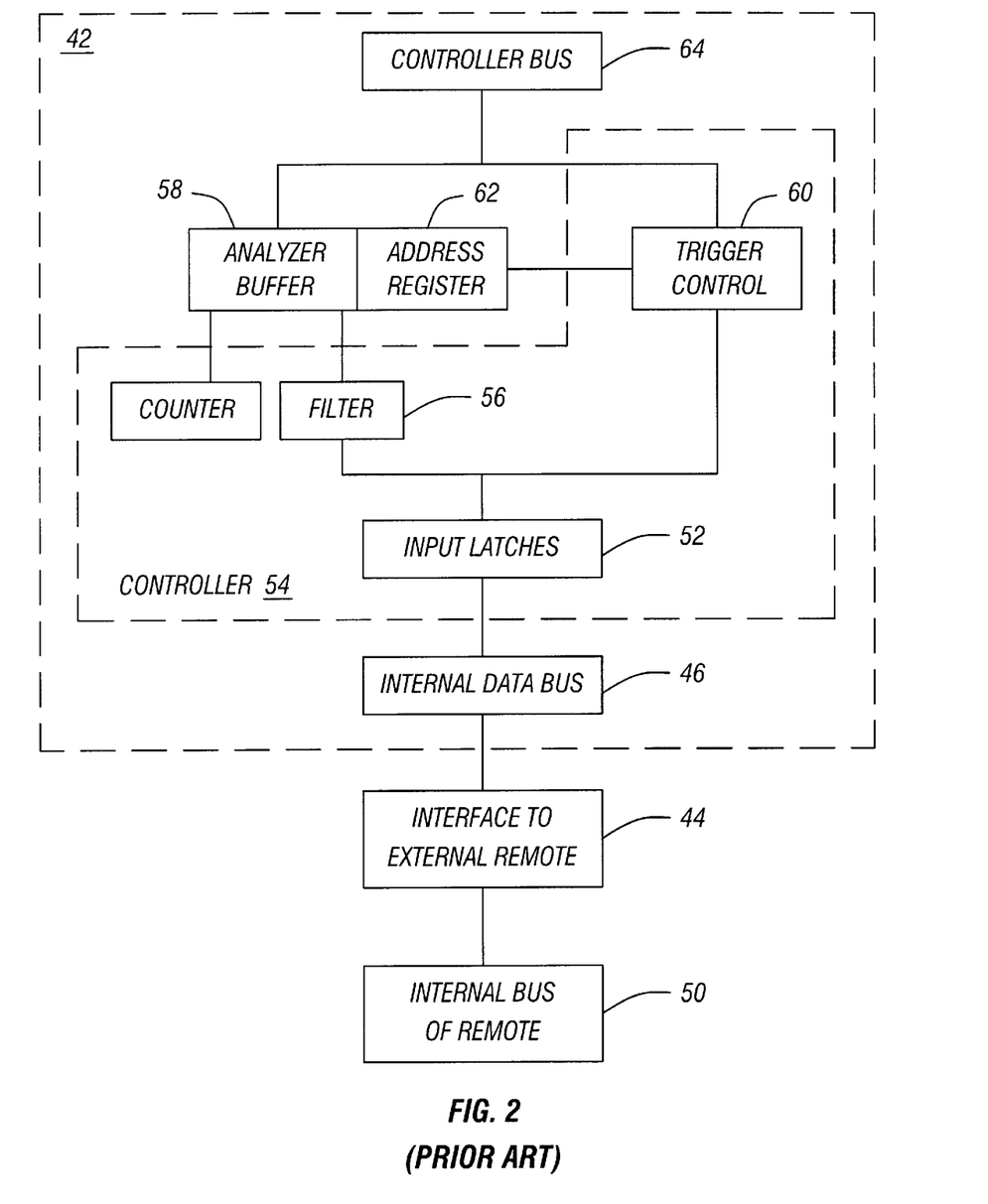
FIG. 2 is a prior art apparatus for monitoring and analyzing the operation of a remote computer.

FIG. 2 illustrates a prior art monitoring device 42 disclosed in U.S. Pat. No. 5,630,048 ('048). In the monitoring device 42, an interface 44 connects an internal data bus 46 of the monitoring device 42 to an internal bus 50 of a remote computer (not shown). The input latches 52 connect a controller 54 to the data bus 46 of the monitoring device 42. Signals go from the latches 52 to a filter circuit 56. An output of the filter circuit 56 goes to an analyzer buffer 58 and a writable memory (not shown). A trigger control 60 also receives signals from the latches 52. An address register 62 for data of the analyzer buffer 58 is also connected to the trigger control 60. The analyzer buffer 58 and trigger control 60 connect through a controller bus 64 to a central processing unit (not shown).

The monitoring device 42 of FIG. 2 passively receives data or control signals that appear on the internal bus 50 of the remote computer. The latches 52 receive signals at the sending rate of the internal bus 50 of the remote computer. Then, the received signals follow two paths. The first path leads to the trigger control 60 which compares the received signals with signal signature patterns stored in a library file (not shown). By comparing the received signals to the signal signature patterns, the trigger controller 60 can identify certain types of transactions on the internal bus 50 of the remote computer. Along the second path, the signals pass through the filter circuit 56 which reduces the signal for storage in the analyzer buffer 58. Data from the trigger controller 60 and the reduced signal portions from the analyzer buffer 58 are preferably written to correlated memory addresses. The stored signal portions and data from the trigger control 60, may be used for subsequent analysis of the performance of the remote computer.

The '048 monitoring device collects real-time operations data that may be used subsequently to perform a detailed analysis of the remote computer. In a manufacturing context, it is preferable to not only collect data in real-time, but also analyze the data in real-time to obtain an immediate analysis of the operation of the remote computer with respect to simple pass/fail criteria. Pass/fail tests are usually more rapid when the remote computer performs the test internally and supplies test results that do not require further analysis by the monitoring device. In an assembly line, it is preferable that the monitoring device obtain test results as opposed to operations data from the remote computer and that the monitoring device not make an independent analysis of the real-time operations of the remote computer.

The present invention is directed to overcoming, or at least reducing the effects of, one or more of the problems set forth above.

SUMMARY OF THE INVENTION

The invention comprises, in one embodiment, a monitoring device, including a reporting device capable of taking a fail action responsive to receiving a first signal and a processing unit capable of sending the first signal to the reporting device, when the processing unit does not receive a new result signal during a preselected time period.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments in not intended to limit the invention to the particular forms disclosed, but on the contrary, the intension is to cover all modifications, equivalents, and alternatives falling within the spirit and scope of the invention as defined by the appended claims.

DETAILED DESCRIPTION OF SPECIFIC EMBODIMENTS

Specific embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

Figure 3:
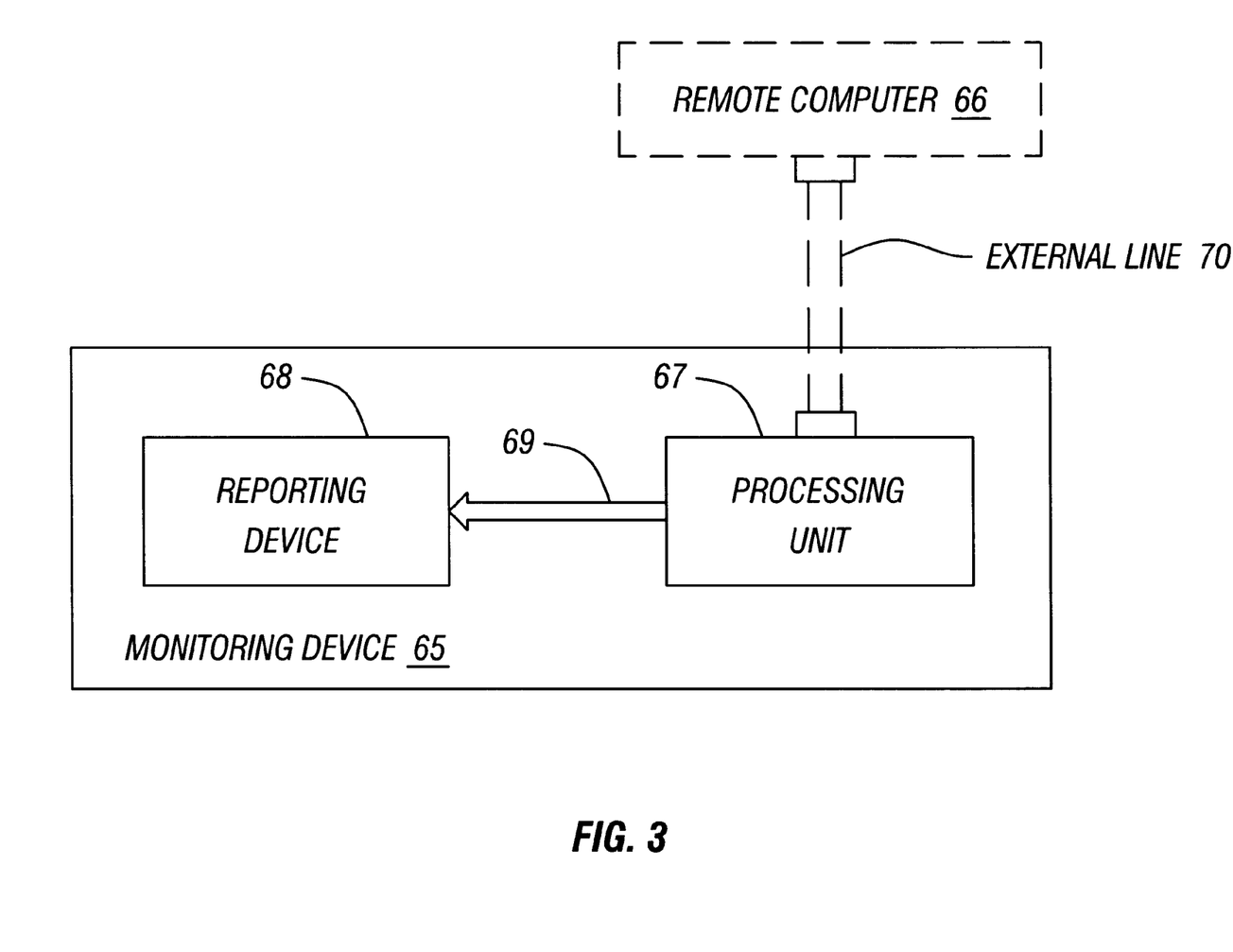
FIG. 3 is a block diagram illustrating an embodiment of a monitoring device in accord with the invention.

FIG. 3 is a block diagram conceptually illustrating an embodiment of a monitoring device 65 for monitoring the internal operations of a remote personal computer (PC) 66 that is undergoing an internal test. The monitoring device 65 includes a processing unit 67 and a reporting device 68. The processing unit 67 is connected to the reporting device 68 by a bus 69 including one or more conductive lines. In the operation, the monitoring device 65 is connected by one or more external lines 70 connecting to the remote PC 66.

Figure 4:
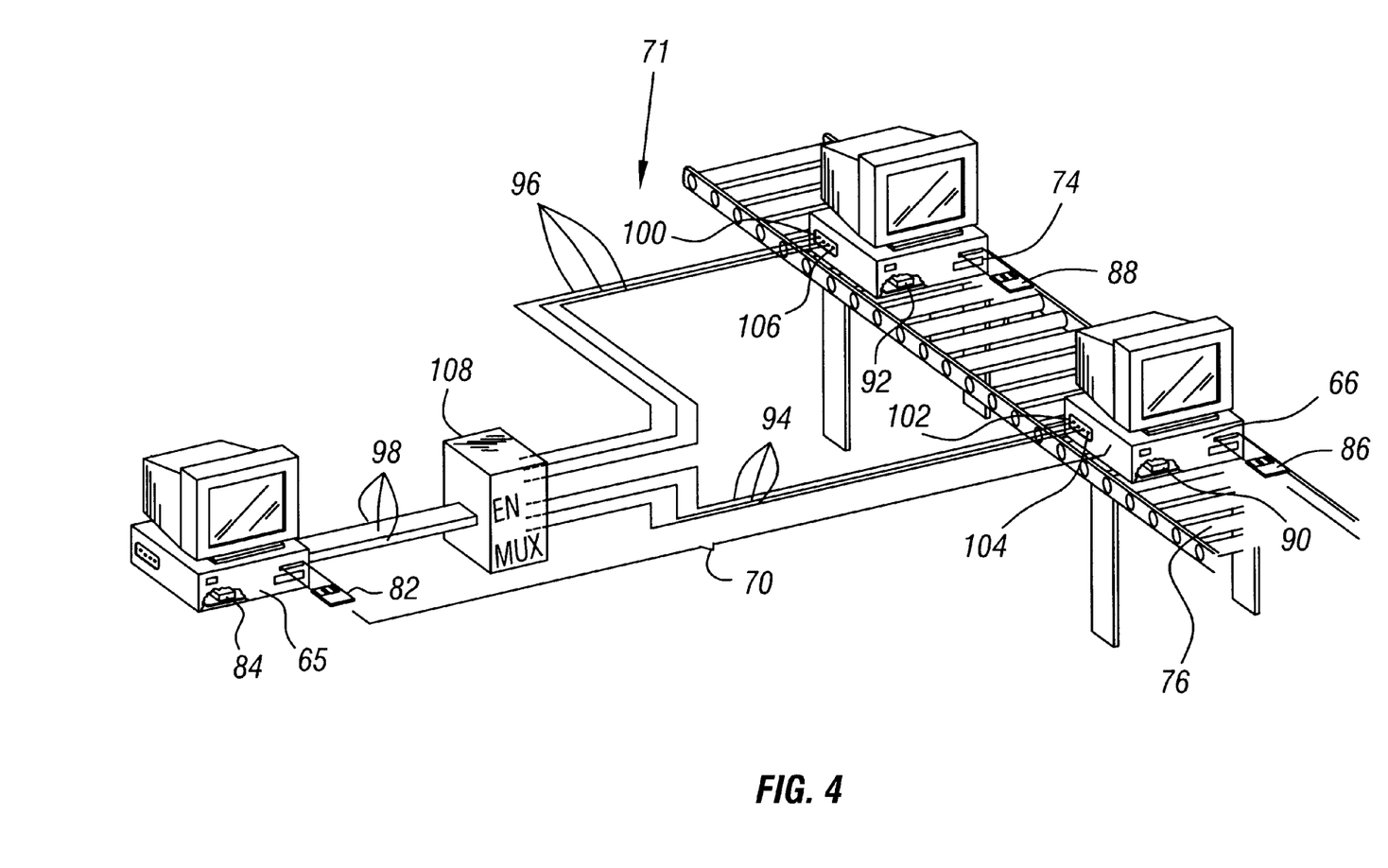
FIG. 4 illustrates one particular embodiment for a monitoring device in accord with the present invention.

FIG. 4 shows one particular embodiment of an apparatus 71 for monitoring internal tests being performed on one or more remote personal computers (PC) 66 and 74 in accord with the present invention. The remote computers 66 and 74 may, for example, be situated on an assembly line or conveyor system 76. The external line 70 connects the remote PC's 66 and 74 to the monitoring device 65. The monitoring device 65 in the embodiment illustrated is a computer having a first program encoded on a portable program storage medium 82. Note, however that the first program may alternately be stored in a main memory 84 of the computer. Although the monitoring device 65 illustrated in FIG. 4 is a computer the invention is not so limited. The remote PC's 66 and 74 have write programs encoded on program storage media 86 and 88 loaded into main memories 90 and 92 thereof either as active programs or as terminate and stay resident (TSR) programs, e.g., where the operating systems are single task systems. In some alternative embodiments, only one PC 66 is monitored at any one time by the monitoring device 65.

The line 70 includes first sets of conductive lines 94 and 96 from the remote PC's 66 and 74 and a second set of conducting lines 98 to an input/output ("I/O") port (not shown) of the computer. The apparatus 71 may be used to either passively or actively monitor the testing of the remote PC's 66 and 74. If the monitoring device 65 only passively monitors the remote PC's 66 and 74, the first set of conducting lines 94 and 96 may connect to pins 100 and 102 of parallel ports 104 and 106 on the remote PC's 66 and 74. In other embodiments, the first set of conducting lines 94 and 96 may connect to serial ports, network ports, ethernet ports, or some other input/output port (not shown) of the remote PC's 66 and 74. The particular embodiment of FIG. 4 passively monitors testing, and thus the first set of conducting lines 94 and 96 are connected to the parallel parts 104, 106. If the monitoring device 65 monitors several remote PC's 66 and 74 substantially simultaneously, the external line 70 may include multiplexer 108 that enables switching the sets of lines 94 and 96 from the different remote PC's 66 and 74 or the monitoring device 65 and the logic device 108 may make up a server, i.e. a device that enables the monitoring device 65 to monitor more than one remote PC, e.g., 66 and 74, substantially simultaneously.

Figure 5:
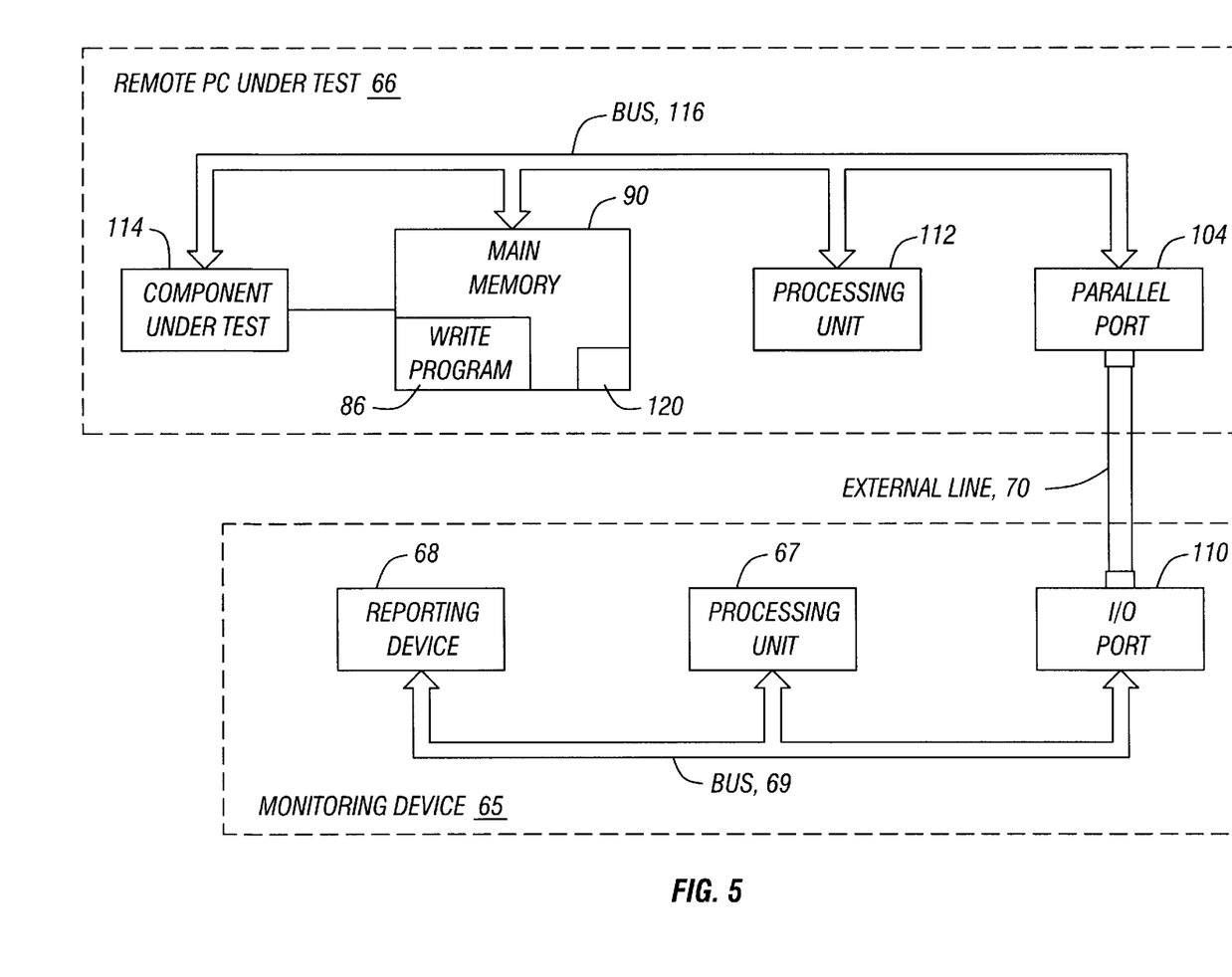
FIG. 5 is a block diagram illustrating the specific embodiment of FIG. 4.

FIG. 5 is a block diagram conceptually illustrating data and instruction paths of the particular embodiment 71 of FIG. 4. The line 70 connects the parallel port 104, or other I/O port, of the remote computer 66, to an I/O port 110 of the monitoring device 65. The parallel port 104, a first processing unit 112, a component 114 being tested, and the main memory 90 are connected to an internal bus 116 of the remote PC 66. In some PC's, the bus 116 actually includes several buses. The component being tested 114 may be any component of the remote PC 66 including, in some alternate embodiments, the processing unit 112 and the main memory 90. The main memory 90 has addresses 118 to which the write program is compiled or stored from the program storage medium 86 and one or more addresses 120 where status data on the test is stored. In some embodiments, the write program and/or the test status may be stored in other memories of the remote computer 66. In the particular embodiment of the monitoring device 65 shown in FIG. 4 the I/O port 110, a second processing unit 67, and a reporting device 68 are connected by a second internal bus 69. Again, the internal bus 69 may actually comprise several buses.

The test runs under the control of the processing unit 112 and a program (not shown) internal to the remote computer 66. In some alternate embodiments, the start and stop of the test may be externally initiated. During the test, the processing unit 112 ordinarily writes test status data to the above-mentioned addresses 120 in the main memory 90. Test results are subsequently written to the parallel port 104 by the write program 86. The write program 86 in various alternative embodiments may be the program running the test, a separate program if the operating system supports multiple tasks, or a terminate and stay resident program ("TSR") if the operating system only supports single tasks, for example DOS. Normally, the test status data may include data that the test is continuing, that the test has been passed, or that the test has been failed, but the status data may also include details on the test results. Test results are written to the parallel port 104 either periodically or, in some embodiments, as a response to inquiry signals sent to the remote computer 66 by the monitoring device 65. The inquiries are sent to a serial port (not shown) of the remote PC 66 and may, in various embodiments, induce only the result signal that the test is continuing or induce all of the result signals. In some embodiments, the result signals may only be sent from the remote PC 66 in response to the inquiry signals.

Figure 6A:
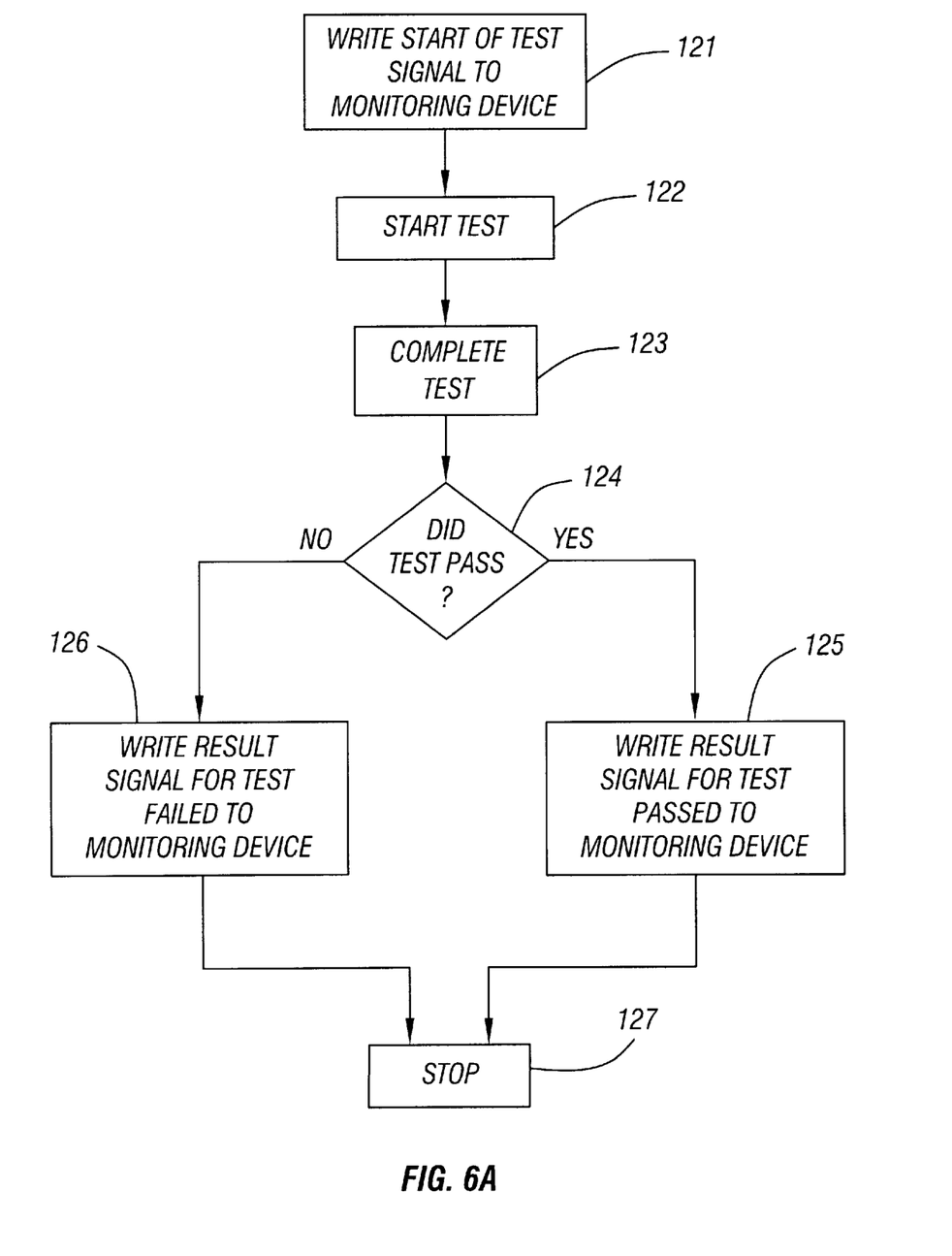
FIG. 6A is a flow chart illustrating acts performed by the remote computer undergoing an internal test in FIGS. 3–5, in a first embodiment.

FIG. 6A is a flow chart illustrating a first embodiment for the operation of the remote PC 66 and write program 86 during the internal test. At block 121, the remote PC 66 is activated by some modality, and the remote PC's 66 write program 86 writes a "start of test" signal to the port 104 of the remote PC 66. At block 122, the remote PC 66 starts the internal test. At block 123, the remote PC 66 completes the internal test. At block 124, the remote PC 66 determines whether the internal test was passed. At block 125, the write program 86 writes a result signal for "test passed" to the port 104 connected to the monitoring device 65 in response to the internal test having been passed. At block 126, the write program 86 writes a result signal for "test failed" to the port 104 connected to the monitoring device 65 in response to the internal test having been failed. At block 127, the remote PC 66 stops.

Figure 6B:
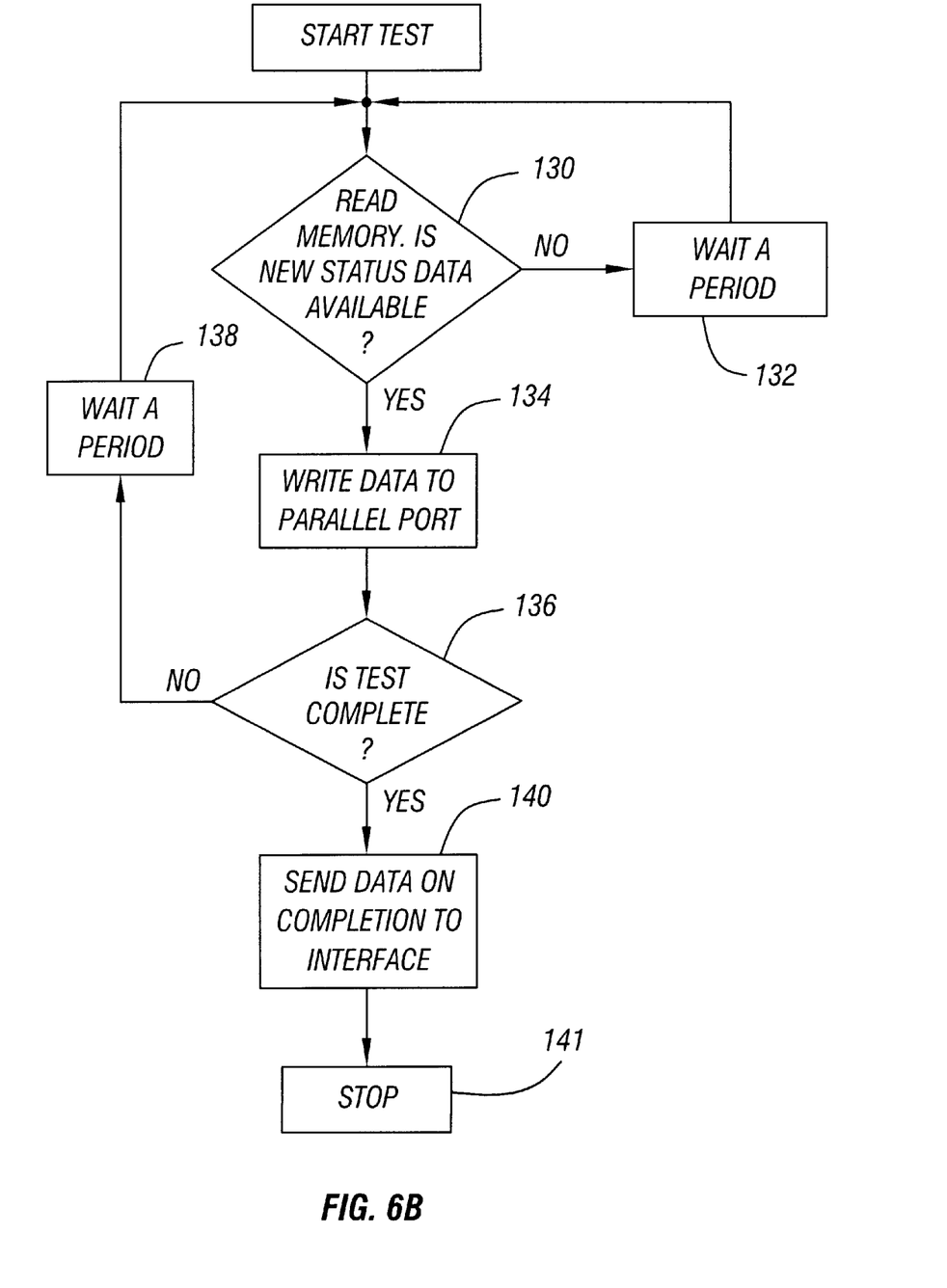
FIG. 6B is a flow chart illustrating acts performed by the remote computer undergoing an internal test in FIGS. 3–5, in a second embodiment.

FIG. 6B is a flow chart illustrating a second embodiment for the operation of the write program 86 on the remote PC 66. In various embodiments, the write program 86 becomes active in response to a call be the program performing the test (not shown), in response to a timing routine, or in response to an inquiry from the monitoring device 65. The write program 86 first reads the memory addresses 120 containing the test status data at block 130. If new test status data are not available, the write program 86 waits for a period at block 132 before again reading the memory addresses 120 at block 130. In various embodiments, the wait period at block 132 may be terminated by an internal timing routing, by another call from the program running the test, or by another inquiry sent by the monitoring device 65. If the memory addresses 120 contain new status data, the write program 86 writes the data to the parallel port 104 at block 134 in the form of the associated result signal. New status data includes data that the test has been failed or passed or data that the test is continuing has completed another step. If the new status data does not indicate the test's completion at block 136, the write program waits for a period at block 138 before again reading the memory addresses 120 containing status data at block 130. Again, in various embodiments, the wait period at block 138 may be terminated by an internal timing routine, by a call from the program running the test, or by another inquiry from the monitoring device 65. If the status data indicates completion of the test, the write program 86 writes the pass or fail result signal to the parallel port 104 at block 104 and stops at block 141.

Figure 7:
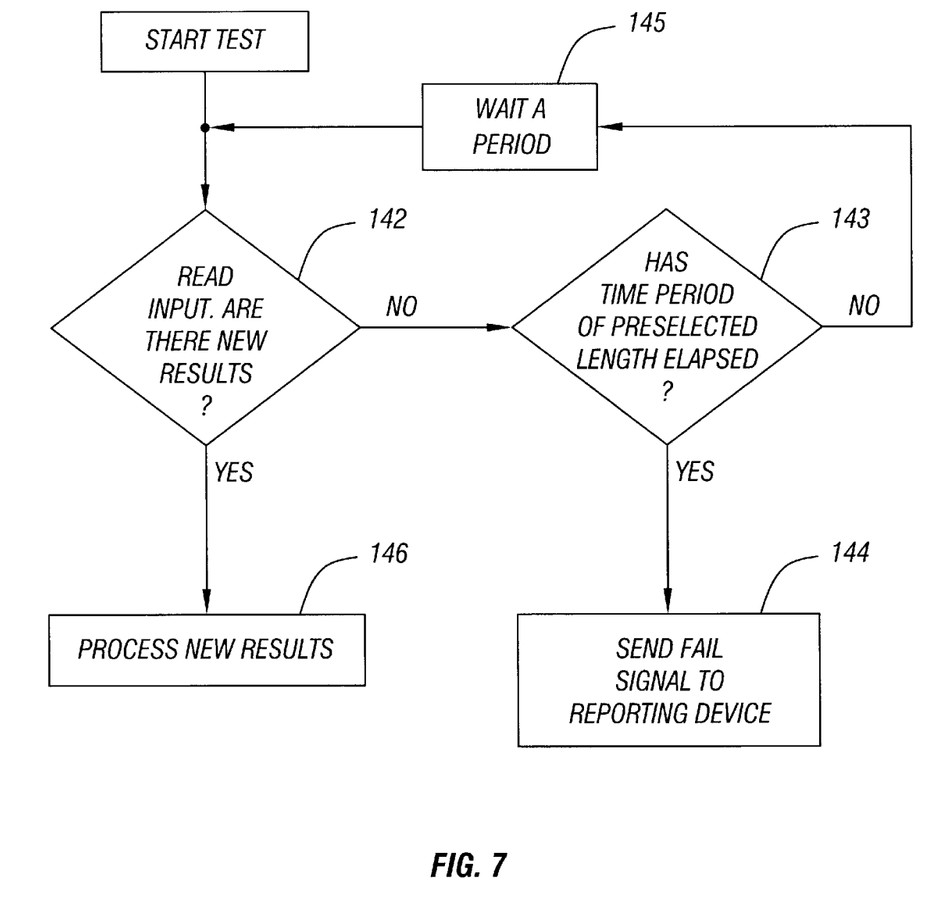
FIG. 7 is a flow chart illustrating monitoring activities of the monitoring device of FIG. 3.

FIG. 7 is a flow chart illustrating the operation of the monitoring device 65 in the embodiment of FIG. 3. The processing unit 67 periodically reads the external line 70 for new result signals at block 142. If new result signals are not found, the processing unit 67 checks at block 143 whether a preselected time period has elapsed since the last time new result signals were read. If such a time period has elapsed, the processing unit 67 sends to the reporting device 68 a fail signal at block 144, and the reporting device 68 takes a failure action. The reporting device 68 may signal the test status to an operator (not shown), for example, by lighting light emitting diodes or by forming images or visual signals on a cathode ray tube. The reporting device 68 may perform acts including, for example, controlling a portion of an assembly line or a portion of a conveyor system, i.e. an assembly line or conveyor system for manufacturing and/or testing PC's 66 and 74. In particular embodiments, the reporting device may take other pass and fail acts, but generally the fail acts are distinguishable from pass acts. For example, the reporting device 68 may light one light emitting diode in response to the pass signal and a different light emitting diode in response to a fail signal. If a time period of the preselected length has not passed, the processing unit 67 waits during a wait period at block 145 and then, rereads the external lines 70 for new test result signals at block 142. When a new test result signal is read, the processing unit 67 processes the new result signals at block 146. The process continues until the reporting device 68 receives either a pass or fail signal or determines that no new result signal has been received during the preselected time period.

A hard lock condition in the remote PC 66 does not result in false signals at the reporting device 68. A hard lock condition in the remote PC 66, leads to either a non-alternating result signal or no result signal on the external line 70 as was discussed above. New result signals do not include situations where either a non-alternating, constant, result signal for test continuing or where no result signal is read from the external line 70. As illustrated at blocks 143 and 144 of FIG. 7, the processing units 67 of above-described embodiments send the fail signal to the reporting device 68 when no new result is read during a time period of the preselected length.

Figure 8:
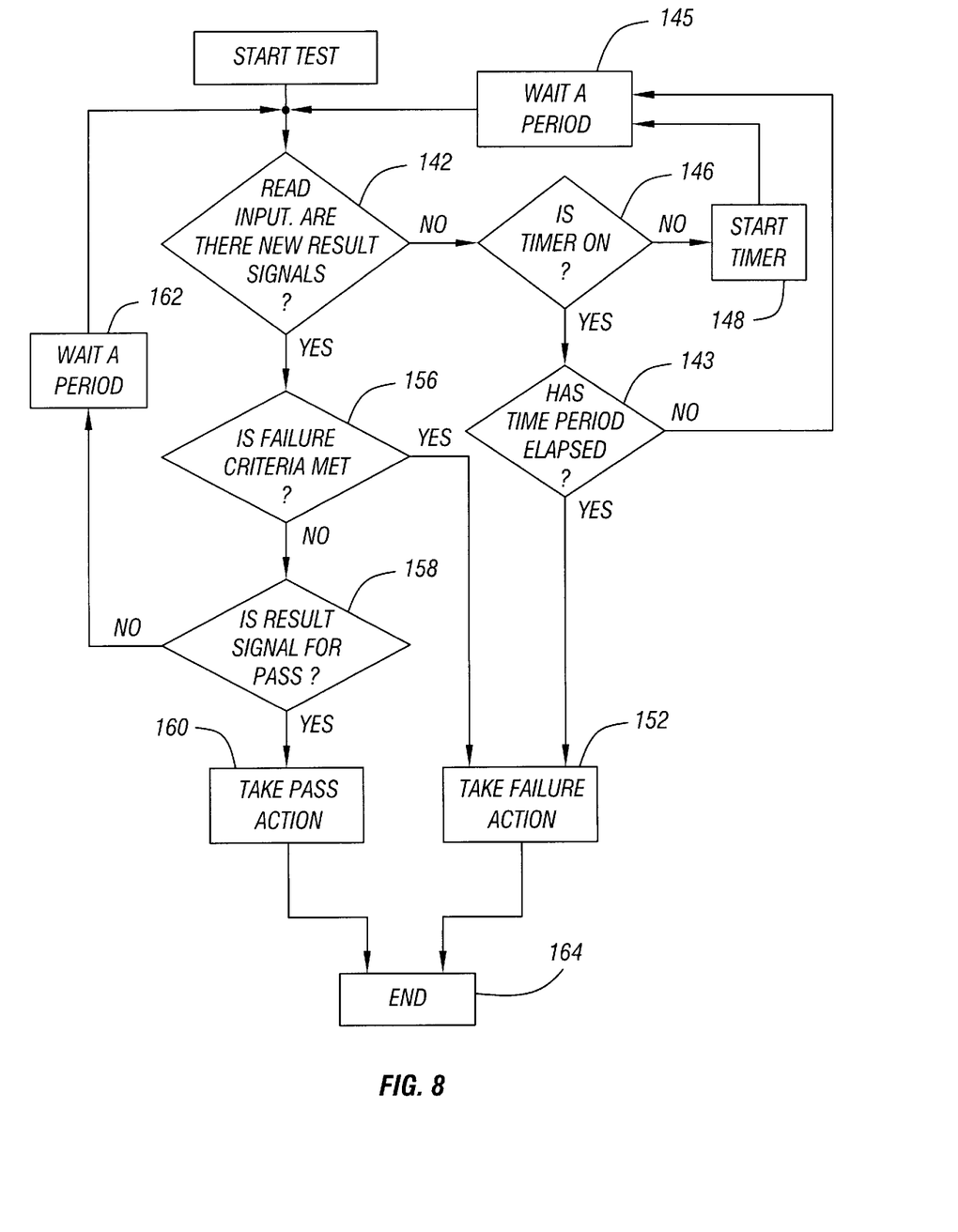
FIG. 8 is a flow chart illustrating the monitoring activities performed by the specific embodiment of FIGS. 4–5.

FIG. 8 illustrates the operation of the particular monitoring device 65 of FIGS. 4–5. The processing unit 67 periodically reads the input, e.g., I/O port 110, for new result signals at block 142. If new result signals are not found, the processing unit 67 checks a timing subroutine at block 146. The processing unit 67 starts the timing routine if the routine is not already started at block 148. If the timing unit is already started, the processing unit 67 checks whether a time period of the preselected length has elapsed since the timer was started at block 143. If such a time period has elapsed, the processing unit sends a fail signal to the reporting device 68, and the reporting device 68 takes a failure action at block 152. If a time period of the preselected length has not elapsed, the processing unit 67 waits during a wait period having a second preselected length at block 145 and then, rereads the input at block 142. When a new test result signal is read at the input, the processing unit 67 determines whether the result signal indicates failure of the test at block 145. If the result signal indicates failure, the processing unit 67 sends the fail signal to the reporting device 68, and the reporting device 68 takes the failure action. If the result signal does not indicate failure, the processing unit 67 checks whether the result signal indicates that the test was successfully completed or passed at block 158. If the data indicates that the test was passed, the processing unit 67 sends the pass signal to the reporting device 68, and the reporting device 68 takes a pass action at block 160. If the test is not completed, the processing unit repeats the read cycle after waiting a third preselected period at block 162. A pass or fail action ends the monitoring procedure at block 164. Generally, the processing unit 67 is controlled by the program encoded in the program storage medium 82 or the main memory 84 as illustrated in FIG. 4.

Referring to FIG. 8, if the particular monitoring device 65 passively monitors the remote PC 66, the new result signals do not include either constant, non-alternating, result signals that the test is continuing or the absence of any result signal. In the processing unit 67, such a definition of new result signals can be implemented using software or hardware, in a manner apparent to these in the art having the benefit of this disclosure. In embodiments where the monitoring device 65 actively sends inquiries to the remote computer 66, the definition of new result signals may be different. For example, in one specific embodiment, the write program 86 only writes the result signal for "test is continuing" in response to a prior inquiry sent by the monitoring device 65. In this embodiment, new result signals include any non-zero result signal. Other definitions for new result signals, as used in FIG. 8, are within the scope of the present invention if such definitions exclude both constant, non-alternating result signals that the test is continuing and the absence of a result signal.

Figure 9:
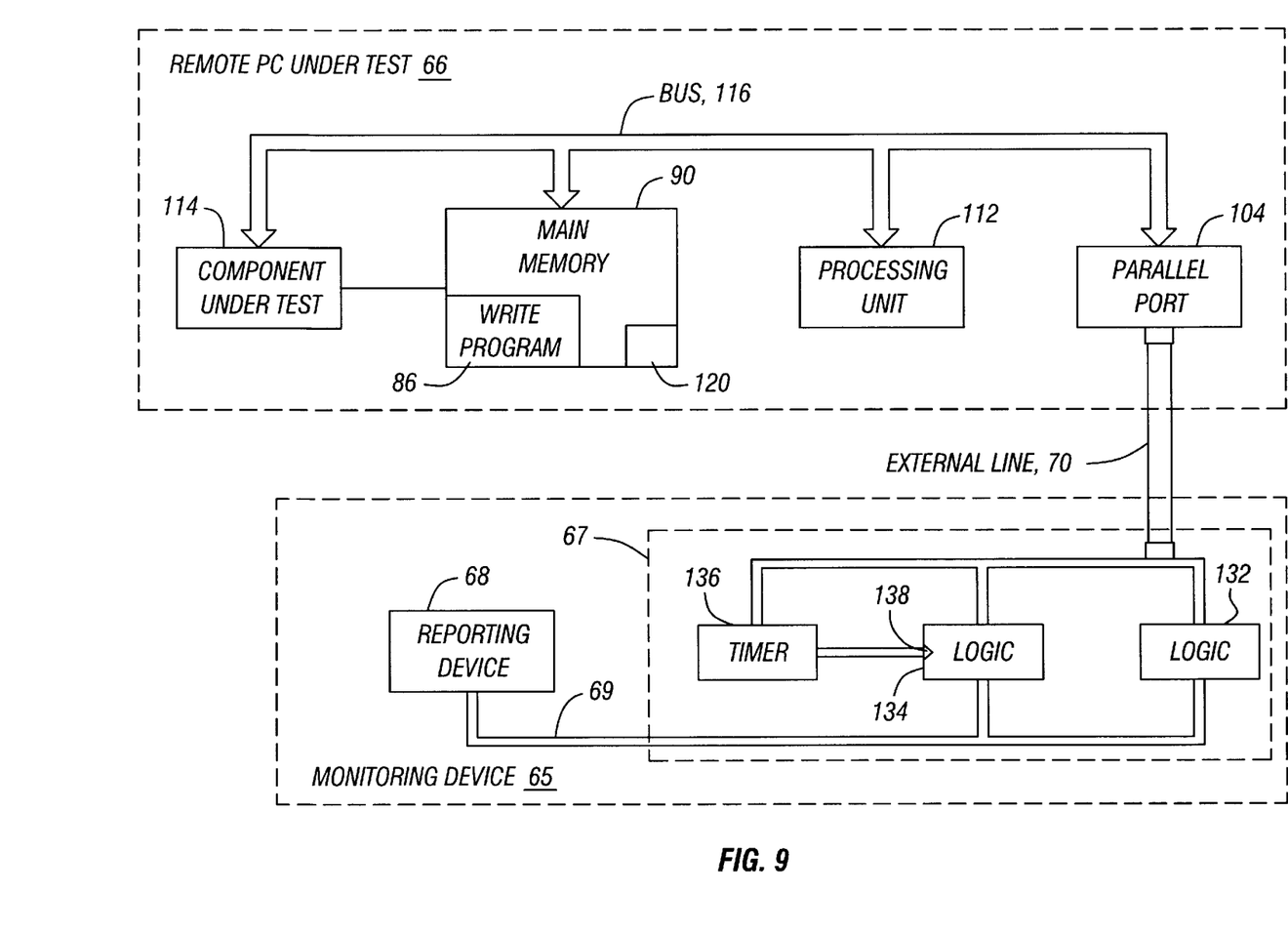
FIG. 9 is a block diagram illustrating an alternate embodiment of the monitoring device of FIG. 3, wherein the monitoring device employs simple logic circuits.

FIG. 9 illustrates an alternate embodiment, wherein the monitoring device 65 of FIG. 3 is made of simple logic circuits. The processing unit 67, in this particular embodiment, includes two simple combinational logic circuits 132 and 134, e.g., non-sequential logic circuits, and a timer circuit 136 that connect in parallel to the external line 70. In some embodiments, logic circuits 132 and 134 may be replaced by sequential logic circuits. An output of the timer circuit 136 connects to an enable input 138 of the second combinational logic circuit 134. Lines 69 connect outputs of the first and second logic circuits 132 and 134, in parallel, to the reporting device 68.

The processing unit 67 passively monitors the remote PC 66 with the two simple logic circuits 132 and 134 and the timer circuit 136. The first logic circuit 132 sends first and second logic signals to the reporting device 68 in response to receiving the result signals that the test is failed or passed from the external line 70. The second logic circuit 134 only sends the above-mentioned first logic signal and only in response to receiving, from the external line 70, either no result signal or a constant, non-alternating result signal that the test is continuing. The timer circuit 136 controls an enable input 138 of the second logic circuit 134 and enables the second logic circuit 134 only after the result signal from the external line 70 is constant during at least one time period of a preselected length. Situations where the second logic circuit 134 sends an output to the reporting device 68 define the no new result signal situation in this embodiment of the monitoring device 65. The reporting device 68 takes the same fail and pass actions in response to said respective first and second logic signals as in other embodiments.

All the methods and apparatus disclosed and claimed herein may be made and executed without undue experimentation in light of this specification. While the apparatus and methods of this invention have been described in terms of specific embodiments, it will be apparent to those of ordinary skill in the art that variations may be applied to the methods and apparatus herein without departing from the concept, spirit, and scope of the invention. All such variations and modifications apparent to those of ordinary skill in the art are deemed to be within the spirit, scope, and concept of the invention as defined by the appended claims.

What is claimed is:

1. A personal computer monitoring device for monitoring an under test personal computer, comprising:
    a reporting device adapted to receive a fail or a pass signal, said reporting device adapted to take a fail action responsive to a fail signal; and
    a processing unit adapted to send the fail signal to said reporting device when one of the following two conditions occur; a result signal is not received within a preselected time period from the under test personal computer, or the result signal received from the under test personal computer running does not alter for the preselected time period;
    wherein said reporting device is adapted to control a portion of an assembly line or operate a portion of a conveyor system.

2. The personal computer monitoring device as set forth in claim 1, wherein said reporting device is further adapted to take a pass action responsive to a pass signal, said processing unit adapted to send said pass signal responsive to receiving a test completed successfully signal from the under test personal computer.

3. The personal computer monitoring device as set forth in claim 1, wherein said personal computer monitoring device comprises a monitoring personal computer.

4. The personal computer monitoring device as set forth in claim 3, wherein said monitoring personal computer includes an I/O port adapted to communicate with said under test personal computer.

5. The personal computer monitoring device as set forth in claim 3, wherein said monitoring personal computer is adapted to send one or more status inquiry signals to said under test personal computer, wherein the under test personal computer is adapted to send said new result signal in response to the one or more status inquiry signals.

6. The personal computer monitoring device as set forth in claim 4, further comprising an external line having first and second ends, said second end connecting to the I/O port and said first end connecting to a port of said under test personal computer.

7. The personal computer monitoring device as set forth in claim 1, wherein said personal computer monitoring device comprises a server, the server capable of substantially simultaneously monitoring at least two remote under test personal computers.

8. The personal computer monitoring device as set forth in claim 1, wherein said processing unit includes:
    a first logic circuit adapted to send said fail signal to said reporting device when said first logic circuit is enabled and is not receiving said new result signal; and
    a timing unit capable of enabling said first logic circuit when said new result signal is not received during said preselected time period.

9. The personal computer monitoring device as set forth in claim 2, wherein said reporting device includes first and second light emitting diodes, said first light emitting diode adapted to emit light in response to said fail signal and said second light emitting diode adapted to emit light in response to said pass signal.

10. An apparatus for monitoring internal tests on one or more remote personal computers, each of said one or more remote personal computers having a write program for periodically writing result signals that the internal test is failed, passed or continuing to a port thereof, said apparatus comprising:
    a processing unit at least capable of sending a fail signal when one of the following two conditions occur; a result signal is not received within sa preselected time period from the remote personal computer running said internal test, or the result signal received from the remote personal computer running said internal test does not alter for the preselected time period; and
    a reporting device at least capable of taking a fail action responsive to said fail signal;

wherein said action is selected from a group consisting of lighting light emitting diodes, forming images on a cathode ray screen, controlling a portion of an assembly line, and operating a portion of a conveyor system.

11. The apparatus as set forth in claim 10, wherein said reporting device includes at least two light emitting diodes, a first of said light emitting diodes adapted to light responsive to a pass signal and a second of said light emitting diodes adapted to light responsive to said fail signal.

12. The apparatus as set forth in claim 10, wherein said processing unit is part of a monitoring computer.

13. The apparatus as set forth in claim 12, wherein said monitoring computer stores a second program, said second program adapted to send a pass signal to said reporting device, said pass signal responsive to a result signal indicating the test has passed from a first of the one or more remote personal computers, said reporting device taking a pass action responsive to said pass signal.

14. The apparatus as set forth in claim 13, wherein said second program further comprises instructions adapted to send said fail signal to said reporting device when another of said result signals from another of the one or more remote personal computers is not received within the time period of the preselected lengths, said time period of preselected length starting at least receipt of one of said result signals.

15. The apparatus as set forth in claim 12, wherein said monitoring computer has a second program, said second program comprising instructions for:

sending at least one status inquiry signal to one of said remote personal computers; and sending the fail signal when none of the result signals is received during the time period of preselected length, said time period of preselected length starting when one of said inquiry signals was last sent.

16. The apparatus as set forth in claim 10, wherein said processing unit includes a logic circuit, said logic circuit adapted to send said fail signal when said processing unit does not receive any of said result signals during any of said time periods.

17. The apparatus as set forth in claim 10, further comprising a plurality of external lines having first and second ends, said second ends adapted to connect to the monitoring apparatus and each of said first ends adapted to connect to one of said remote personal computers.

18. An apparatus for monitoring an internal test on a remote personal computer, comprising:

a reporting device adapted to receive one or more result signals, wherein the one or more signals indicate a fail, pass, or a continuing state, said reporting device adapted to take an action responsive to receiving a fail signal; and means for processing capable of sending the fail signal to said reporting device when a result signal is not received within a preselected time period from the remote personal computer running said internal test, or the result signal is received from the remote personal computer does not alter for the preselected time period;

wherein said action is selected from a group consisting of lighting light emitting diodes, forming images on a cathode ray screen, controlling a portion of an assembly line, and operating a portion of a conveyor system.

19. The apparatus as set forth in claim 18, wherein said means for processing is further adapted to periodically send an inquiry signal to said remote personal computer.

* * * * *

UNITED STATES PATENT AND TRADEMARK OFFICE
CERTIFICATE OF CORRECTION

PATENT NO. : 6,098,182
DATED : August 1, 2000
INVENTOR(S) : Jeffrey Cowan

It is certified that error appears in the above-identified patent and that said Letters Patent are hereby corrected as shown below:

Col. 8, line 61, replace "sa" with --a--.
Col. 9, line 25, replace "least" with --last--.

Signed and Sealed this

Twenty-second Day of May, 2001

Attest:

NICHOLAS P. GODICI

Attesting Officer     Acting Director of the United States Patent and Trademark Office